United States Patent
Ambrosio et al.

(10) Patent No.: US 9,471,404 B1
(45) Date of Patent: Oct. 18, 2016

(54) ENRICHING API REGISTRY USING BIG DATA ANALYTICS

(71) Applicant: International Business Machines Corporation, Armonk, NY (US)

(72) Inventors: Ronald Ambrosio, Poughquag, NY (US); Amol A. Dhondse, Pune (IN); Chitra Dorai, Chappaqua, NY (US); Anand Pikle, Pune (IN); Krishnan K. Ramachandran, Campbell, CA (US); Gandhi Sivakumar, Victoria (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/876,934

(22) Filed: Oct. 7, 2015

(51) Int. Cl.
*G06F 3/00* (2006.01)
*G06F 9/54* (2006.01)
*G06F 17/30* (2006.01)
*G06F 9/44* (2006.01)

(52) U.S. Cl.
CPC .............. *G06F 9/543* (2013.01); *G06F 8/30* (2013.01); *G06F 9/54* (2013.01); *G06F 17/30525* (2013.01)

(58) Field of Classification Search
CPC ................................. G06F 9/54; G06F 8/30
USPC .......................................... 719/310; 717/106
See application file for complete search history.

(56) References Cited

U.S. PATENT DOCUMENTS

| | | | |
|---|---|---|---|
| 5,895,472 A * | 4/1999 | Brodsky et al. | G06F 8/71 |
| 6,253,257 B1 | 6/2001 | Dundon | |
| 6,546,548 B1 * | 4/2003 | Berry et al. | G06F 11/3466 |
| | | | 717/128 |
| 7,188,114 B2 | 3/2007 | Liu et al. | |
| 7,444,522 B1 | 10/2008 | Chang et al. | |
| 7,818,331 B2 | 10/2010 | Zubev | |
| 7,844,612 B2 | 11/2010 | Colgrave et al. | |
| 7,904,480 B2 | 3/2011 | Palanisamy | |
| 8,099,709 B2 | 1/2012 | Baikov et al. | |
| 8,239,419 B2 | 8/2012 | Lo | |
| 8,595,246 B2 | 11/2013 | Fay et al. | |
| 8,650,479 B2 | 2/2014 | Jardine-Skinner et al. | |
| 2009/0024561 A1 | 1/2009 | Palanisamy | |
| 2010/0161629 A1 | 6/2010 | Palanisamy et al. | |
| 2012/0144295 A1 | 6/2012 | Clark et al. | |
| 2013/0318536 A1 | 11/2013 | Fletcher et al. | |

(Continued)

OTHER PUBLICATIONS

Mark J.Kilgard, The OpenGL Utility Toolkit(GLUT) Programming Interface API Version 3, 1996.*

(Continued)

*Primary Examiner* — Lechi Truong
(74) *Attorney, Agent, or Firm* — Garg Law Firm, PLLC; Rakesh Garg; Matthew Chung

(57) ABSTRACT

For data integration using APIs, a request for data is analyzed to determine a set of functional characteristics and a set of non-functional characteristics expected in the data. A first API entry is selected in a registry of API entries, the first API entry corresponding to a first API of the first data source. The first API entry includes a first metadata corresponding to a first functional characteristic in the set of functional characteristics. The first API is invoked to obtain a first portion of the data, the first portion having the first functional characteristic. Using a second API entry in the registry, a second API is invoked to obtain a second portion of the data. The first portion and the second portion are returned in a response to the request.

19 Claims, 6 Drawing Sheets

(56) References Cited

U.S. PATENT DOCUMENTS

2014/0040182 A1  2/2014  Gilder et al.
2014/0379762 A1  12/2014  Suresh et al.

OTHER PUBLICATIONS

Anonymously; Metadata driven system for REST-based application development, Aug. 8, 2011.
Anonymously; A System and Method for Providing Meta-data Model based Distributed Data Validation, Feb. 3, 2012.
Aravindh et al; Decentralized Service Discovery Approach Using Dynamic Virtual Server, International Journal of Advanced Research in Computer and Communication Engineering vol. 3, Issue 1, Jan. 2014.
Ahmed et al; Dynamic Web Service Discovery Model Based on Artificial Neural Network with QoS Support, International Journal of Scientific & Engineering Research vol. 3, Issue 3, Mar. 2012, ISSN 2229-5518.
Kirubakaran et al; Service Discovery Framework with Functional and Non-Functional Information (SDF), International Journal of Advanced Research in Computer Science and Software Engineering, vol. 2, Issue 12, Dec. 2012 ISSN: 2277 128X.
Armin Haller et al., Business Process Management Workshops, BPM 2005 International Workshops, BPI, BPD, ENEI, BPRM, WSCOBPM, BPS, Nancy, France, Sep. 5, 2005.

\* cited by examiner

ENRICHING API REGISTRY USING BIG DATA ANALYTICS

TECHNICAL FIELD

The present invention relates generally to a method, system, and computer program product for data integration. More particularly, the present invention relates to a method, system, and computer program product for enriching API registry using big data analytics.

BACKGROUND

"Big data" generally refers to a large and diverse data set. Within big data, a variety of data sources produce or provide data, data streams, time-series, and updates thereof, all of which form the data set of big data. While traditional data sources, for example, repositories of structured data can contribute to big data, the particular challenges with big data arise from the unstructured or unforeseeably composed data that flows from relatively new types of data sources, such as Smarter Cities, wearable technologies, social media, on-the-go devices, and the Internet of Things. Thus, big data setup often uses tools and technologies specifically designed for handling, analyzing, and manipulating a wide variety of data from a wide variety of sources without undesirable latency.

Analytics is the science of data analysis. Big data analytics includes tools and techniques designed for use with big data. Big data analytics are used to gain insight into the available data by analyzing available data to create, infer, deduce, or derive new information or knowledge.

A data source, also interchangeably referred to hereinafter as simply a "source", provides data in some form to a big data configuration. Generally, the data source publishes a set of Application Programming Interface (API) using which data can be obtained from the data source.

An API implements a functionality at a system. An API is code-based tool or method, such as a function call in a programming language, using which the functionality can be activated or operated. In case of a data source, an API allows another system to perform an operation at a system of the data source to obtain certain data from the data source. For example, quite commonly, a data source API has to be used to provide authentication and billing credentials for access to the source's data. Different sources implement different APIs to obtain different parts of their data in different manners, for different purposes, using different protocols, and the like.

An API generally accepts a set of zero or more input parameters. A function or method invoked by calling an API performs a corresponding functionality. The operation of a function or method can result in data manipulation, data output, or both. In case of a data source, an API call generally results in data output—referred to as a result set—from the data source.

When a consumer application needs data that is available at a data source, the consumer application has to be integrated with the data source. The integration is configured to call the correct API of the correct data source with a correct set of parameters, to receive the result set, and to provide the result set to the consumer application.

Many entities have recognized that analyzing the wealth of data available about people, objects, and events can give their businesses an edge. Accordingly, more and more consumer applications—also referred to herein as requestor(s) or requestor application(s)—are seeking out useful data from data sources. Not surprisingly, more and more owners of sources of data are preparing to sell their data to data consumer applications.

The illustrative embodiments recognize that there has been an explosive growth in the number of data sources, the volume of data from these sources, and the number of APIs that must be used to gain access to this volume of data. The illustrative embodiments recognize that even if the APIs are published by a data source, each API of each data source requires some integration effort, and such integration efforts quickly become non-trivial.

The illustrative embodiments recognize that even after such expensive integration efforts, the resulting data from the selected data source may not meet a requestor's requirements. The illustrative embodiments recognize that big data configurations can play an important role in enabling a requestor application to get just the right data from the right combination of sources, according to the requestor's needs.

SUMMARY

The illustrative embodiments provide a method, system, and computer program product for enriching API registry using big data analytics. An embodiment includes a method for data integration using APIs. The embodiment analyzes, using a processor and a memory, a request for data to determine a set of functional characteristics and a set of non-functional characteristics expected in the data. The embodiment selects a first API entry in a registry of API entries, the first API entry corresponding to a first API of the first data source, wherein the first API entry includes a first metadata corresponding to a first functional characteristic in the set of functional characteristics. The embodiment invokes the first API to obtain a first portion of the data, the first portion having the first functional characteristic. The embodiment invokes, using a second API entry in the registry, a second API to obtain a second portion of the data). The embodiment returns the first portion and the second portion in a response to the request.

Another embodiment includes a computer program product for data integration using APIs, the computer program product comprising one or more computer-readable storage devices, and program instructions stored on at least one of the one or more storage devices.

Another embodiment includes a computer system for data integration using APIs, the computer system comprising one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
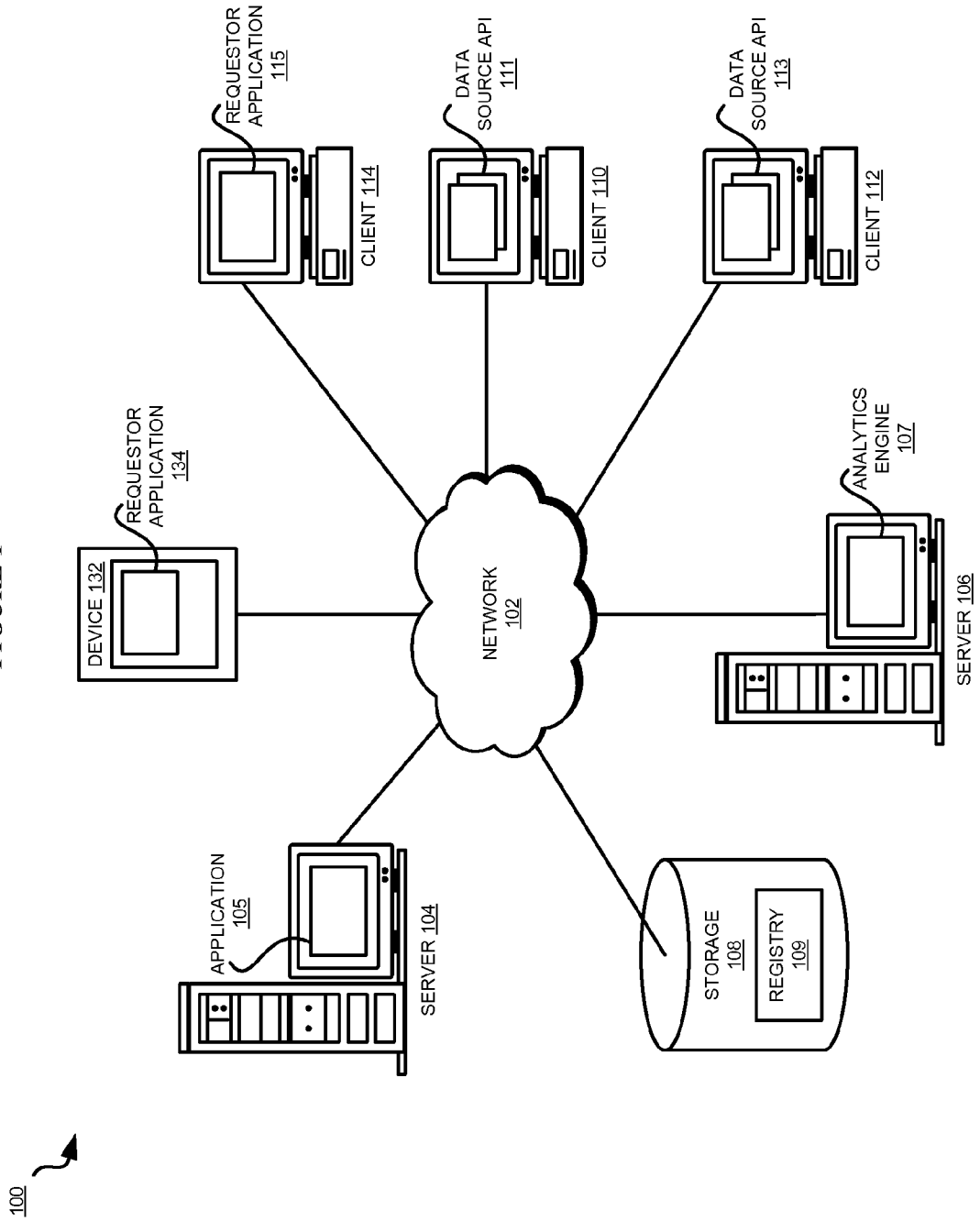
FIG. 1 depicts a block diagram of a network of data processing systems in which illustrative embodiments may be implemented.

The illustrative embodiments used to describe the invention generally address and solve the above-described problems and other problems related to API-based systems integration. The illustrative embodiments provide a method, system, and computer program product for enriching API registry using big data analytics.

An embodiment executes as an application in, or in conjunction with, a data processing system used for big data analytics. For example, an embodiment can be implemented as a modification of an existing application that interfaces with the APIs of data sources in a big data configuration, such that the modified application operates in a manner described herein.

An embodiment identifies a data source. The embodiment identifies a set of APIs associated with the data source. The embodiment analyzes an API in the set of APIs to determine the set of parameters to supply and the result set to expect from the API.

An embodiment further analyzes a result set obtained from the API of the data source. In some cases, the result set may be a historical result set, obtained from a previous invocation of the API. In some other cases, the embodiment invokes the API to receive a result set from the data source in a response to the invocation.

Data of a data source, and consequently data in a result set, can have functional (F) and non-functional (NF) aspects or characteristics. A functional aspect of data is either a data item contained in the data or information that describes the data or a data item therein. For example, if the data includes personal information of people, some non-limiting example functional aspects of the data may include data items such as age, gender, and location of a person. Some non-limiting example functional aspects of the data may include descriptive information such as the age of the data or a data item, the relevance of the data or a data item, confidence value of the data or a data item, a category of the data or a data item, and accuracy of the data or a data item.

A non-functional aspect of data is indicative of a restriction, procedure, value, or consequence of obtaining the data or a data item. For example, if the data includes personal information of people, some non-limiting example non-functional aspects of the data may include a security policy to obtain the data or a data item, cost of retrieving the data or a data item, usage or usage restriction of the data or a data item, method of metering or measuring the data or data item retrieval, encryption policies, authentication requirements, and the like.

An embodiment identifies functional and non-functional aspects of a result set corresponding to an API of a data source. In some cases, the embodiment self-learns a functional characteristic from the data set even when the functional characteristic is not provided in the result set. For example, a result set may not include a confidence level—which is a functional characteristic of a data item. One embodiment computes the confidence level by comparing the data item received from the source with a comparable data item received from another source of known veracity or reliability. The embodiment determines a confidence level of the data item from the data source depending upon a degree of match with the data item of the known veracity. Similarly, an age of a data item from a source can also be established by comparing a time of capture of the data item with a current time.

Similarly, a relevance value of a data item can be established based on a type of the data item and an age of the data item. For example, location data item can become stale quicker than a name data item for a person.

These examples of functional and non-functional aspects and methods of computing certain functional aspects are not intended to be limiting. From this disclosure, those of ordinary skill in the art will be able to conceive many other functional and non-functional aspects and methods for computing other functional and non-functional aspects, and the same are contemplated within the scope of the illustrative embodiments.

An embodiment constructs metadata corresponding to the API. For example, in one embodiment, the metadata includes the functional aspects available in the result set from the API. In another example embodiment, the metadata includes the functional aspects available in the result set from the API and the non-functional aspects of the result set.

In another example embodiment, the metadata includes some combination of the functional and non-functional aspects of the result set from the API and the gaps in the result set. A gap in the result set is an functional aspect that is missing, of lower-than-a-threshold confidence value, of poor quality, or some combination thereof. For example, if the result set includes personal information data of several persons, but does not include a phone number of the persons, the phone number is a functional aspect that is absent from the result set. As another example, if the result set includes personal information data of several persons, but includes a one-month old or older locations of the persons, the location data item is a functional aspect that is of poor quality in the result set. As another example, if the result set includes personal information data of several persons, and includes only the previously known addresses of the persons, the location data item is a functional aspect that has a confidence value, which is below a threshold in the result set.

These examples of gap metadata are not intended to be limiting. From this disclosure, those of ordinary skill in the art will be able to conceive many other types and circumstances for determining gaps and gap metadata, and the same are contemplated within the scope of the illustrative embodiments.

Therefore, the metadata of an API according to an embodiment comprises functional aspects, non-functional aspects, gaps, or some combination thereof. An embodiment stores or updates metadata of an API in a registry. The registry is a repository of API information and the API metadata. API information includes the published API interface information, such as the name of the interface, the set of input parameters, and the result set of the API.

An embodiment receives a request from a requestor application. The request specifies the data that is requested. In some cases the request may specify one or more functional and/or non-functional aspects of the requested data. In such cases, the embodiment extracts the specified one or more functional and/or non-functional aspects of the requested data.

For example, a request may specifically request personal information that includes current location data of persons. Accordingly, the embodiment determines that the request specifies two functional aspects—the location and the recency of the location.

As another example, a request may specifically request personal information where the cost of obtaining the data should not exceed x dollars. Accordingly, the embodiment determines that the request specifies a non-functional aspect—the cost of obtaining the data. Within the scope of the illustrative embodiments, a request can specify any number and types of functional aspects, non-functional aspects, or some combination thereof.

In other cases, the request may not specify the functional and/or non-functional aspects of the requested data. In such cases, the embodiment analyzes the request, and the requested data to determine a set of functional and/or non-functional aspects that should be present in the data to satisfy the request.

For example, a request may request personal information that is suitable for targeted advertising to individuals. Accordingly, the embodiment determines that the requested data should have two functional aspects—the location and the recency of the location. Within the scope of the illustrative embodiments, a request can provide any number or type of information, including but not limited to a purpose for the requested data that is usable for determining a set of functional or non-functional aspects that would satisfy the request.

One embodiment determines whether a one or more APIs at a single source can satisfy the request, to wit, provide the requested data with the desired functional or non-functional characteristics. In some cases, an embodiment may determine that more than one APIs at more than one sources have to be invoked to obtain the requested data. The embodiment determines a mix of the sources and their APIs that have to be invoked to satisfy a request.

In some circumstances, API information from other registries may also be available to an embodiment, such as via a published library from another registry. In such circumstances, when an API metadata in a registry according to an embodiment includes a gap metadata, the embodiment determines whether another API information in another registry can satisfy the gap. If another API from another registry can satisfy the gap, the embodiment records—as a redirect—the other API in the other registry. Particularly, the redirect is recorded in the API metadata where the gap is identified. Thus, when the embodiment determines that an API cannot satisfy a request for a particular functional or non-functional aspect due to a gap in the API metadata corresponding to that functional or non-functional aspect, the embodiment can redirect the request to the other API at the other registry for fulfillment of that requested functional or non-functional aspect.

A method of an embodiment described herein, when implemented to execute on a device or data processing system, comprises substantial advancement of the functionality of that device or data processing system in API integration or date extraction from data sources using APIs. For example, prior-art method of obtaining data from a data source via an API requires extensive knowledge of the numerous APIs of numerous sources without being able to reliably characterize the contents and quality of the data that those APIs return. An embodiment provides a method for determining the functional and non-functional characteristics of the data that various APIs of various data sources return. An embodiment further enables creating a mix of API invocations at a mix of sources to respond to a request for data such that the data matches one or more specified or expected functional or non-functional characteristics in the request. Furthermore, an embodiment further recognizes gaps in a return set of an API and can fill the gaps by using another API at another data source or by redirecting all or part of the request to another registry. Such a manner of enriching API registry using big data analytics is unavailable in presently available devices or data processing systems. Thus, a substantial advancement of such devices or data processing systems by executing a method of an embodiment is in simplifying the API-based integration, maintaining an up-to-date registry of API metadata that characterizes the data that can be obtained from an API, allowing mixing and matching of various APIs at one or more sources to respond to a data request, and when possible also redirecting all or part of a request to other registries for gap fulfillment.

The illustrative embodiments are described with respect to certain sources, APIs, result sets, functional characteristics or aspects, non-functional characteristics or aspects, metadata, API information, registry organization, gaps, redirects, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
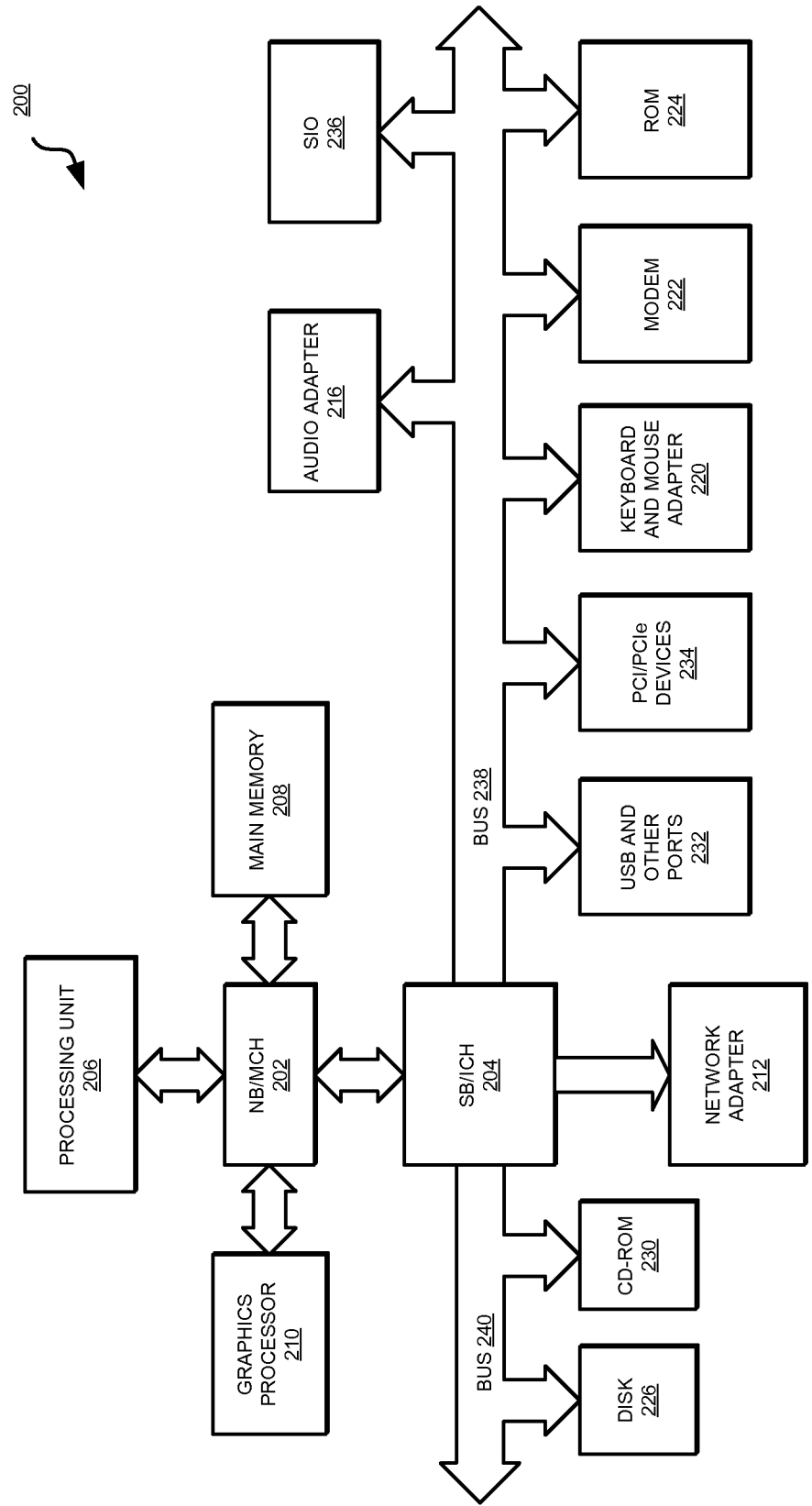
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein, and executes in server 104, which is a part of a big data configuration. Analytics engine 107 provides the big data analytics services in the big data configuration. Data processing system 110 is a data processing system at a data source, and supports APIs 111 as described herein. Data processing system 112 is a data processing system at another data source, and supports APIs 113 as described herein. Application 105 uses analytics engine 107 to analyze the result set of an API, such as from API 111 or 113, to create the metadata in a manner described herein. Application 105 stores and updates the API information and API metadata, such as those pertaining to APIs 111 and 113, in repository 109. Application 134 is an example of a requestor application executing in device 132. Application 115 is another example of a requestor application executing in data processing system 114. Requestor 115 or 134 sends a request for data. Application 105 receives and analyzes the request. Application 105 selects one or more APIs, e.g., an API from APIs 111 and another API from APIs 113, to obtain the data that satisfies the request. According to one embodiment, application 105 uses the obtained data for self-learning, such as by using analytics engine 107 on the obtained data and manipulating one or more entries about API 111 or API 113 in registry 109.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
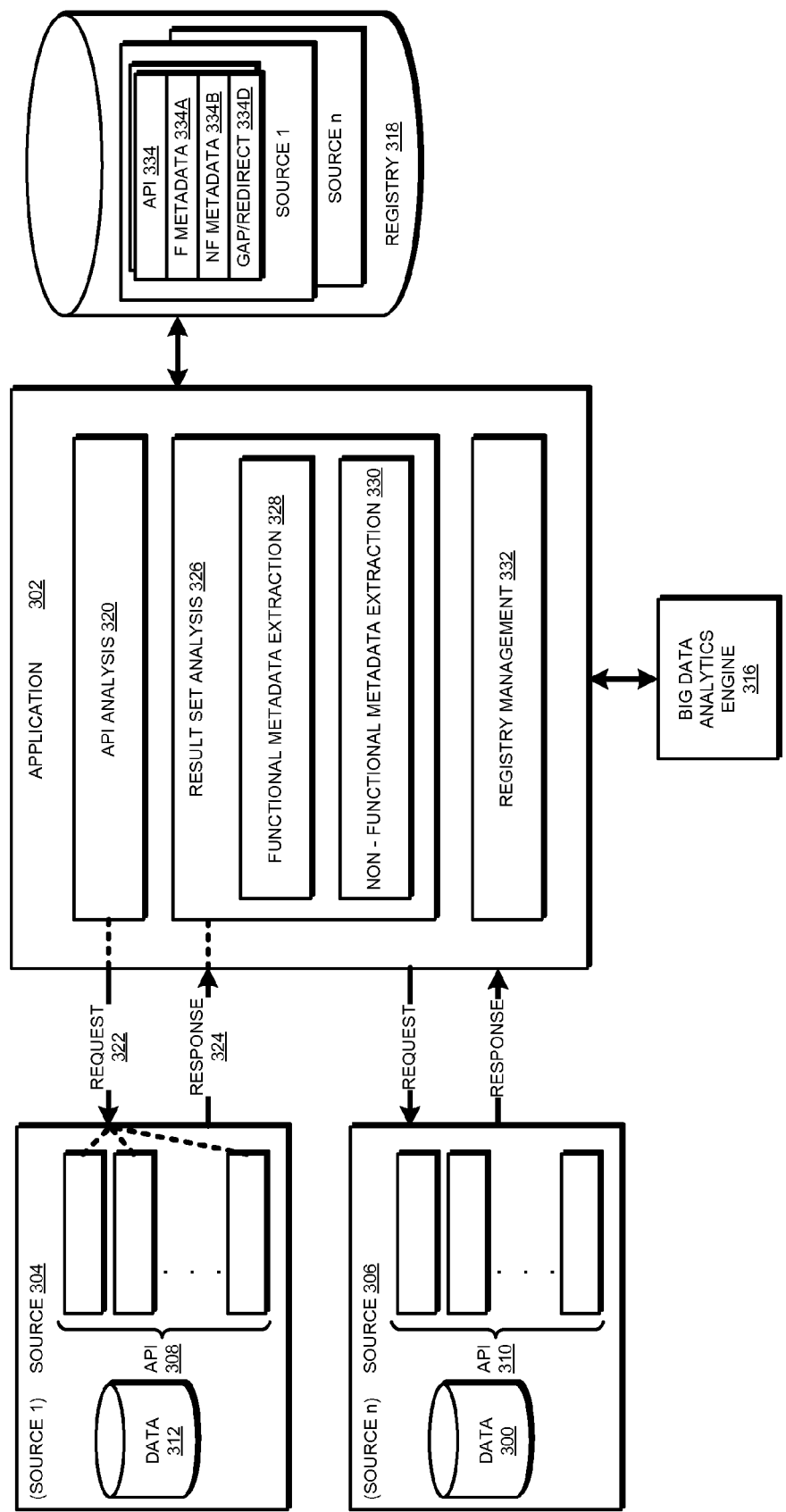
FIG. 3 depicts a block diagram of an example configuration for enriching API registry using big data analytics in accordance with an illustrative embodiment.

With reference to FIG. 3, this figure depicts a block diagram of an example configuration for enriching API registry using big data analytics in accordance with an illustrative embodiment. Application 302 is an example of application 105 in FIG. 1. Data source 304 (labeled "source 1") through data source 306 (labeled "source n") are any number and types of data sources as described herein.

APIs 308 in source 304 and APIs 310 in source 306 are each similar to either of APIs 111 or 113 in FIG. 1. APIs 308 in source 304 can be similar or distinct from and APIs 310 in source 306 depending upon the particular implementations at those sources. APIs 308 allow access to data 312 at source 304, and APIs 310 allow access to data 314 at source 306.

Big data analytics engine 316 is an example of analytics engine 107 in FIG. 1. Registry 318 is an example of registry 109 in FIG. 1.

Component 320 analyzes the APIs presented by a data source. As a non-limiting example, using published information about APIs 308, component 320 may send one or more requests 322 for test data to one or more APIs 308. Source 304 returns one or more responses 324, which include one or more result sets from data 312. As another non-limiting example, component 320 analyzes APIs 308 by using published information about APIs 308 and without sending request 322. As described herein, historical result sets from APIs 308 can be used in place of the result sets in response 324 for a similar analytical purpose. API analysis component 320 similarly operates to analyze APIs 310 at source 306.

Component 326 analyzes a result set in response 324. Particularly, component 326 uses analytics engine 316 to analyze the result set. For example, using analytics engine 316, subcomponent 328 extracts one or more functional aspects from the result set. The extracted functional aspects forms functional metadata for that API in APIs 308 which returned the result set in a particular response 324.

Similarly, using analytics engine 316, subcomponent 330 extracts one or more non-functional aspects from the result set. The extracted non-functional aspects forms non-functional metadata for that API in APIs 308 which returned the result set in a particular response 324.

Result set analysis component 326 similarly operates to analyze one or more result sets from APIs 310 at source 306. In one embodiment, component 326 also analyzes a result set for gaps and creates gap metadata for the API as described herein.

API information and API metadata of an API are collectively referred to as an API entry in repository 318. Component 332 manipulates an API information and an API metadata at registry 318. For example, component 332 can create, add, modify, update, or remove, as needed, an API entry for an API in APIs 308. Similarly, component 332 can create, add, modify, update, or remove as needed any number of API entries for any number or types of APIs 308 or 310, for any number of data sources—sources 1-n.

In one embodiment, registry 318 has a corresponding user interface (UI) (not shown), using which the API entries in registry 318 can be categorized, indexed, or cataloged in an implementation-specific manner. In another embodiment, APIs can be ranked or prioritized in registry 318. For example, API entries of the APIs of a source can be ranked according to their reliability or usefulness of their result sets. As another example, API entries of APIs of different sources, which provide comparable result sets, can be ranked or prioritized according to the quality, recency, accuracy, and other such factors associated with their respective result sets.

As an example, API entry 334 corresponds to an API in APIs 308 at source 304 (source 1). Portion 334A of API entry 334 includes API information about the API as described herein. Portion 334B of API entry 334 includes functional metadata for the API as described herein. Portion 334C of API entry 334 includes non-functional metadata about the API as described herein. Portion 334D of API entry 334 includes gap metadata about the API as described herein.

Figure 4:
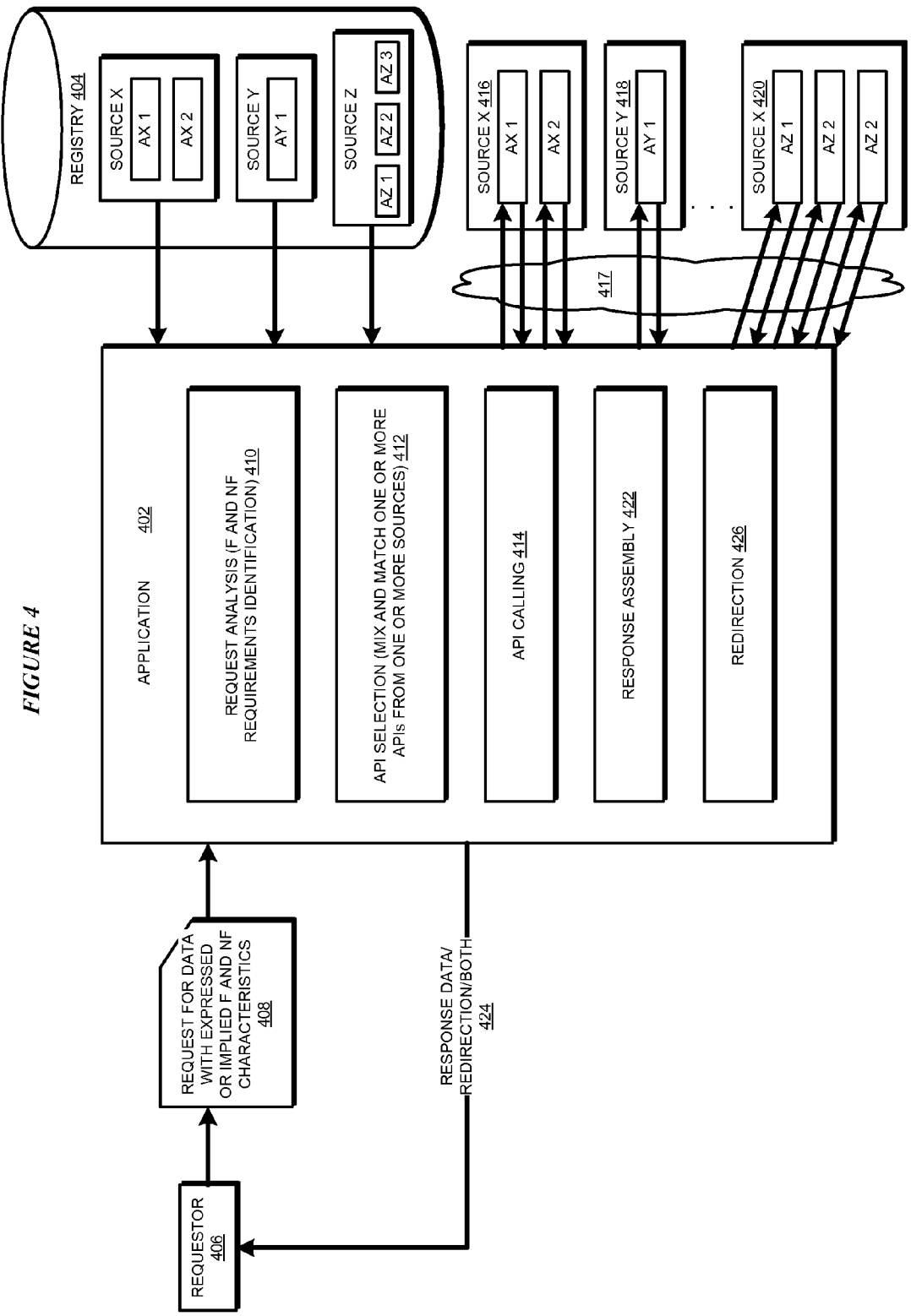
FIG. 4 depicts a block diagram of another example configuration for enriching API registry using big data analytics in accordance with an illustrative embodiment.

With reference to FIG. 4, this figure depicts a block diagram of another example configuration for enriching API registry using big data analytics in accordance with an illustrative embodiment. Application 402 is an example of application 105 in FIG. 1. Registry 404 is an example of registry 318 in FIG. 3. Requestor 406 is an example of requestor 134 or 115 in FIG. 1.

Requestor 406 sends request 408 to a big data configuration, and is received or detected at application 402 executing in the big data configuration. Request 408 may expressly specify one or more functional aspects, non-functional aspects, or a combination thereof, that are desired in response to request 408. Request 408 may specify a purpose of other usability of the data returned in response to request 408, where the purpose or usability implies one or more functional aspects, non-functional aspects, or a combination thereof, that would be desirable in response to request 408.

Component 410 analyzes request 408 to identify the functional aspects, non-functional aspects, or some combination thereof, that should be present in the response data. For example, component 410 also uses big data analytics engine 316 in FIG. 3, for such analysis and identification.

Based on the functional or non-functional aspects identified by component 410 from request 408, component 412 selects the APIs that should be invoked to obtain the response data. Assume, as an example, that registry 404 includes several API entries for the APIs at data source "source X". API entries AX1 and AX2 are API entries corresponding to two such APIs at source X. Similarly, assume that registry 404 includes several API entries for the APIs at data source "source Y". API entry AY1 is an API entry corresponding to one such API at source y. Similarly, assume that registry 404 also includes several API entries for the APIs at data source "source Z". API entries AZ1, AZ2, and AZ3 are API entries corresponding to three such APIs at source Z. Each API entry depicted in repository 404 is formed in the manner of API entry 334 in FIG. 3. Many more API entries for sources X, Y, Z, and other sources can similarly exist in registry 404 but are not depicted for clarity.

Suppose that component 412 determines that a single API from a single source is insufficient for supplying the data that is responsive to request 408. In one example, component 412 further determines that the combination of AX1, AX2, AY1, AZ1, AZ2, and AZ3, when invoked at their respective sources can provide the response data for request 408. Therefore, component 412 selects APIs AX1, AX2, AY1, AZ1, AZ2, and AZ3 for invocation.

Component 414 calls or invokes APIs AX1, AX2, AY1, AZ1, AZ2, and AZ3 with their respective sets of parameters based on request 408 and according to their respective API information in registry 404. Component invokes over network 417, APIs AX1 and AX2 in a manner that source X 416 may specify. Similarly, component invokes over network 417, API AY1 in a manner that source y 418 may specify. Similarly, component invokes over network 417, APIs AZ1, AZ2, and AZ3 in a manner that source Z 420 may specify. Some or all of the invocations return corresponding result sets to application 402.

Component 422 assembles the returned result sets into response data. Response 424 includes the response data.

In another example, component 412 further determines that the combination of AX1, AX2, AY1, AZ1, AZ2, and AZ3, when invoked at their respective sources cannot provide all the response data for request 408. In other words, the invocation of AX1, AX2, AY1, AZ1, AZ2, and AZ3 still leaves a gap, such as a gap identified in gap metadata of one or more of their corresponding API entries in registry 404.

Component 412 selects APIs AX1, AX2, AY1, AZ1, AZ2, and AZ3 for invocation and collects some of the response data as described above. Component 426 identifies a source to which all or a part of request 408 should be redirected to fulfill the gap in the response data. As a non-limiting example, component 426 identifies the other source (not shown) from the published registry information (not shown) from another registry (not shown).

Component 426 prepares a redirection instruction. In one embodiment, response 424 includes the response data from the API invocation and the redirection instruction for the gap in the response data. When none of the APIs described in registry 404 can provide any part of the response data, response 424 may not include any response data and may only include one or more redirect instructions to one or more other sources.

Once application 402 learns that certain APIs satisfy certain requests from certain requestors, application 402 can create bindings of those APIs to those requestors. The bindings can be static bindings or dynamic bindings as may be suitable in a given implementation.

Figure 5:
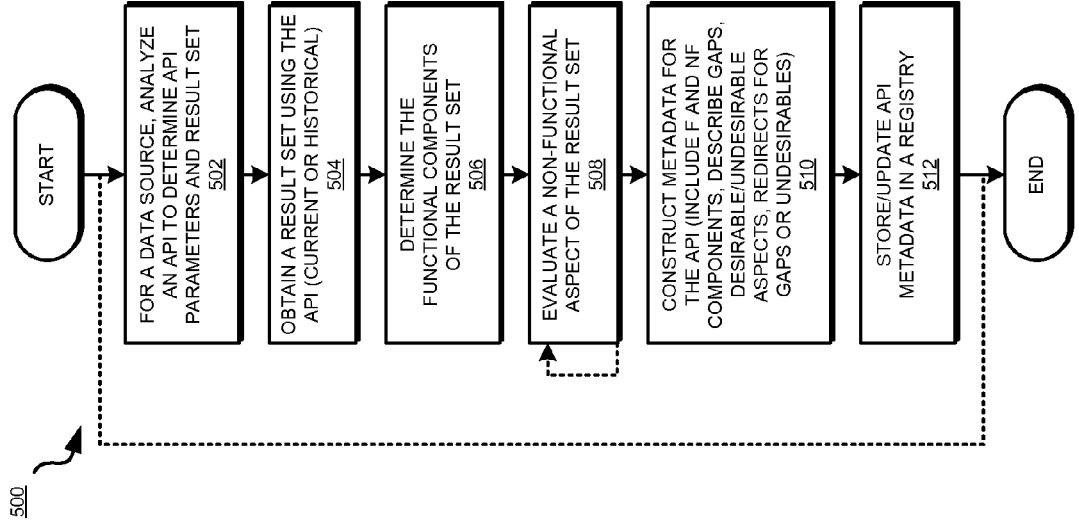
FIG. 5 depicts a flowchart of an example process for enriching API registry using big data analytics in accordance with an illustrative embodiment.

With reference to FIG. 5, this figure depicts a flowchart of an example process for enriching API registry using big data analytics in accordance with an illustrative embodiment. Process 500 can be implemented in application 302 in FIG. 3.

For a data source, the application analyzes an API to determine the API parameters and result set (block 502). The application obtains a result set using the API (block 504). The result set obtained in block 504 can be through an actual invocation of the API or from a historical repository of result sets from a previous invocation of the API.

The application determines the functional characteristics of the result set (block 506). The application makes the determination of block 506 by finding an functional characteristic present in the result set, by analyzing the result set to compute a functional characteristic, or some combination thereof.

The application evaluates a non-functional characteristic of the result set (block 508). The application repeats block 508 for as many non-functional characteristics as may have to be evaluated in a given implementation.

The application constructs the metadata for the API (block 510). The metadata includes functional characteristics, non-functional characteristics, determined gaps, any desirable or undesirable aspects of the result set of the API, any redirections that can be predetermined for the gaps or undesirable aspects, and the like, or some combination thereof, as described herein.

The application stores or updates the API metadata of the API in a registry (block 512). The application ends process 500 thereafter. The application can repeat process 500 for as many APIs of as many sources as may have to be analyzed in this manner.

Figure 6:
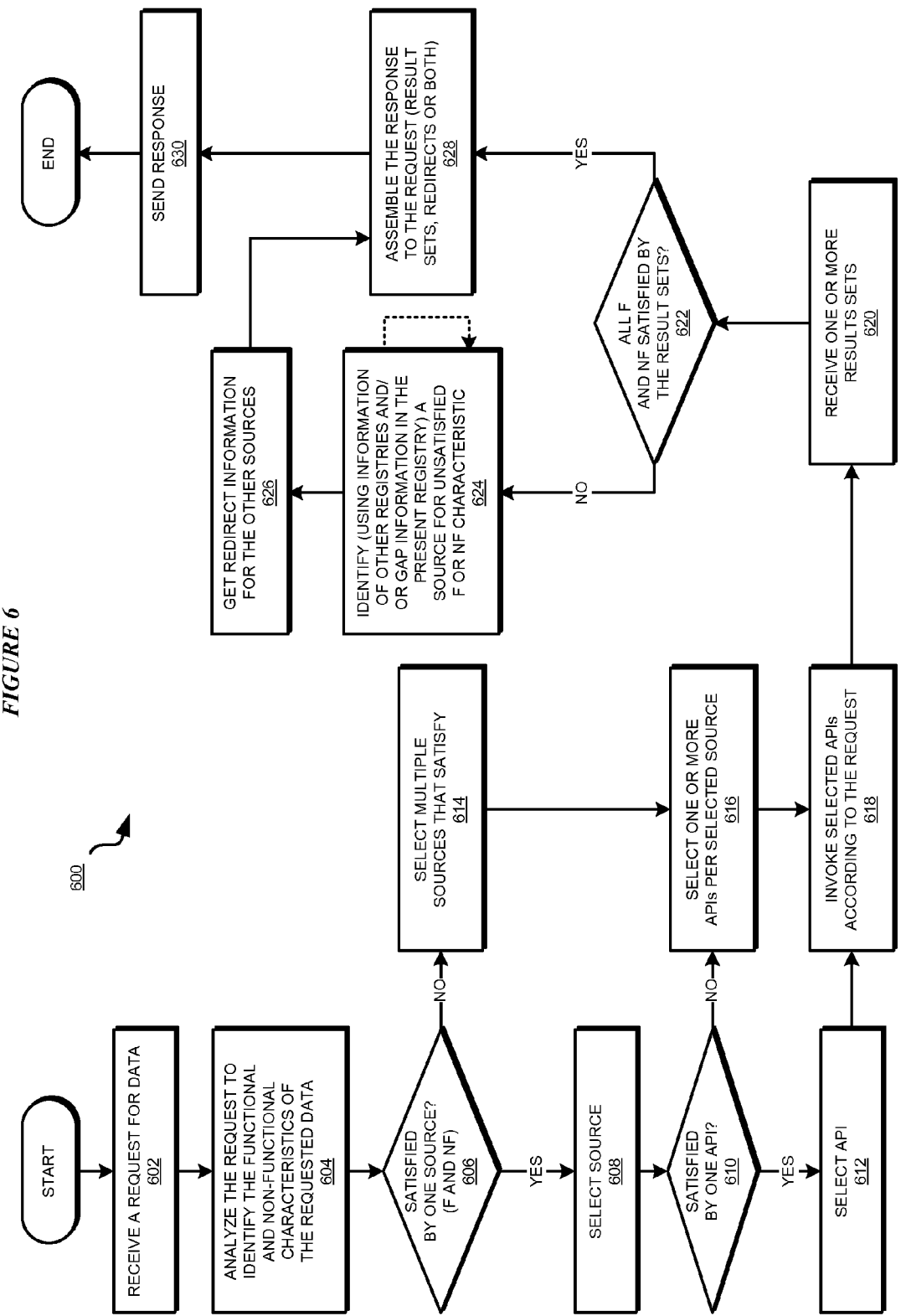
FIG. 6 depicts a flowchart of an example process for enriching API registry using big data analytics in accordance with an illustrative embodiment.

With reference to FIG. 6, this figure depicts a flowchart of an example process for enriching API registry using big data analytics in accordance with an illustrative embodiment. Process 600 can be implemented in application 402 in FIG. 4.

The application receives a request for data (block 602). The application analyzes the request to identify the functional and non-functional characteristics of the requested data (block 604).

The application determines whether the functional and non-functional characteristics of the requested data can be satisfied by a single data source (block 606). If the functional and non-functional characteristics of the requested data can be satisfied by a single data source ("Yes" block 606), the application selects the source (block 608). The application further determines whether the functional and non-functional characteristics of the requested data can be satisfied by invoking a single API of the selected data source (block 610). If a single API will suffice ("Yes" path of block 610), the application selects the API (block 612). The application proceeds to block 618 thereafter.

At block 606, if the functional and non-functional characteristics of the requested data cannot be satisfied by a single data source ("No" path of block 606), the application selects those multiple sources which can satisfy all or most of the requested data (block 614). The application also selects one or more APIs from each of those selected sources for invocation (block 616).

The application invokes the selected one or more APIs from the selected one or more sources (block 618). The application receives one or more results sets as a result of the invocation(s) (block 620).

The application determines whether all functional and non-functional characteristics needed according to the request are satisfied by the result sets (block 622). If not all functional and non-functional characteristics needed according to the request are satisfied by the result sets ("No" path of block 622), the application identifies another source for the data corresponding to an unsatisfied functional or non-functional characteristic (block 624). The application repeats block 624 for as many unsatisfied functional or non-functional characteristics are remaining to be satisfied.

The application obtains redirect information for such other source(s) (block 626). The application assembles the response to the request using the result set(s), the redirection(s), or some combination thereof (block 628). If all functional and non-functional characteristics needed according to the request are satisfied by the result sets ("Yes" path of block 622), the application performs block 628 as well.

The application sends the response to the requestor that sent the request (block 630). The application ends process 600 thereafter.

Thus, a computer implemented method, system or apparatus, and computer program product are provided in the illustrative embodiments for enriching API registry using big data analytics. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for data integration using application programming interfaces (APIs), the method comprising:
   analyzing, using a processor and a memory, a request for data to determine a set of functional characteristics and a set of non-functional characteristics expected in the data;
   selecting a first API entry in a registry of API entries, the first API entry corresponding to a first API of the first data source, wherein the first API entry includes a first metadata corresponding to a first functional characteristic in the set of functional characteristics;
   invoking the first API to obtain a first portion of the data, the first portion having the first functional characteristic;
   invoking, using a second API entry in the registry, a second API to obtain a second portion of the data; and
   returning the first portion and the second portion in a response to the request;
   analyzing the first API of the first data source to identify a set of input parameters and a first result set of the first API of the first data source;
   computing, using big data analytics, a functional characteristic of the first result set, the functional characteristic being the first functional characteristic;
   computing a non-functional characteristic of the first result set;
   constructing the first API entry, wherein the first API entry comprises the set of input parameters, the first metadata corresponding to the functional characteristic, and a second metadata corresponding to the non-functional characteristics.

2. The method of claim 1, further comprising:
   determining that a second functional characteristic in the set of functional characteristics is unavailable from any API entries in the registry;
   selecting from another published registry, a second data source, wherein the second data source has an API whose result set has the second functional characteristic; and including, in the response to the request, a redirecting instruction, such that at least a portion of the request can be redirected to the second data source.

3. The method of claim 1, further comprising:
determining, by using the big data analytics, that the first result set excludes a second functional characteristic; and
adding in the first API entry, a third metadata corresponding to the absence of the second functional characteristic.

4. The method of claim 3, further comprising:
selecting from another published registry, a second data source, wherein the second data source has an API whose result set has the second functional characteristic; and
including, in the first API entry of the first API of the first data source, a fourth metadata, the fourth metadata comprising a redirecting instruction to invoke a second API at the second data source.

5. The method of claim 1, wherein the second API is at the first data source, and the second portion has a second functional characteristic in the set of functional characteristics.

6. The method of claim 1, wherein the second API is at a second data source, and the second portion has a first non-functional characteristic in the set of non-functional characteristics.

7. The method of claim 1, further comprising:
selecting a functional characteristic specified in the request as a member of the set of functional characteristics.

8. The method of claim 1, further comprising:
selecting a non-functional characteristic specified in the request as a member of the set of non-functional characteristics.

9. The method of claim 1, further comprising:
evaluating a use of the data stated in the request; and
identifying a functional characteristic as a member of the set of functional characteristics, wherein the identified functional characteristic satisfies the stated use.

10. The method of claim 1, wherein a functional characteristic in the set of functional characteristics is a data item in the data.

11. The method of claim 1, wherein a functional characteristic in the set of functional characteristics is a descriptive information which describes the portion of the data.

12. The method of claim 11, wherein the descriptive information is an age of the portion of the data.

13. The method of claim 11, wherein the descriptive information is an confidence value of the portion of the data.

14. The method of claim 13, wherein the consequence is a cost of obtaining the data.

15. The method of claim 1, wherein a non-functional characteristic in the set of non-functional characteristics is consequence of obtaining the data.

16. The method of claim 1, wherein the method is embodied in a computer program product comprising one or more computer-readable storage devices and computer-readable program instructions which are stored on the one or more computer-readable tangible storage devices and executed by one or more processors.

17. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

18. A computer program product for data integration using application programming interfaces (APIs), the computer program product comprising one or more computer-readable storage devices, and program instructions stored on at least one of the one or more storage devices, the stored program instructions comprising:
program instructions to analyze, using a processor and a memory, a request for data to determine a set of functional characteristics and a set of non-functional characteristics expected in the data;
program instructions to select a first API entry in a registry of API entries, the first API entry corresponding to a first API of the first data source, wherein the first API entry includes a first metadata corresponding to a first functional characteristic in the set of functional characteristics;
program instructions to invoke the first API to obtain a first portion of the data, the first portion having the first functional characteristic;
program instructions to invoke, using a second API entry in the registry, a second API to obtain a second portion of the data; and
program instructions to return the first portion and the second portion in a response to the request;
analyzing the first API of the first data source to identify a set of input parameters and a first result set of the first API of the first data source;
computing, using big data analytics, a functional characteristic of the first result set, the functional characteristic being the first functional characteristic;
computing a non-functional characteristic of the first result set;
constructing the first API entry, wherein the first API entry comprises the set of input parameters, the first metadata corresponding to the functional characteristic, and a second metadata corresponding to the non-functional characteristics.

19. A computer system for data integration using application programming interfaces (APIs), the computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to analyze, using a processor and a memory, a request for data to determine a set of functional characteristics and a set of non-functional characteristics expected in the data;
program instructions to select a first API entry in a registry of API entries, the first API entry corresponding to a first API of the first data source, wherein the first API entry includes a first metadata corresponding to a first functional characteristic in the set of functional characteristics;
program instructions to invoke the first API to obtain a first portion of the data, the first portion having the first functional characteristic;
program instructions to invoke, using a second API entry in the registry, a second API to obtain a second portion of the data; and
program instructions to return the first portion and the second portion in a response to the request;

analyzing the first API of the first data source to identify a set of input parameters and a first result set of the first API of the first data source;

computing, using big data analytics, a functional characteristic of the first result set, the functional characteristic being the first functional characteristic;

computing a non-functional characteristic of the first result set;

constructing the first API entry, wherein the first API entry comprises the set of input parameters, the first metadata corresponding to the functional characteristic, and a second metadata corresponding to the non-functional characteristics.

* * * * *